United States Patent
Bachle et al.

[15] 3,666,039
[45] May 30, 1972

[54] ARRANGEMENT FOR DETECTING SLIDING AND SLIPPAGE OF VEHICLE WHEELS

[72] Inventors: Karl Bachle, Esslingen-Hegensberg; Jurgen Knorr, Neckarsulm, both of Germany

[73] Assignee: Robert Bosch GmbH, Stuttgart, Germany

[22] Filed: July 6, 1970

[21] Appl. No.: 52,192

[30] Foreign Application Priority Data

July 12, 1969 Germany.....................P 19 35 518.1

[52] U.S. Cl...........................180/105 E, 303/21 CF, 310/68
[51] Int. Cl......................................B60t 8/08, B60k 27/06
[58] Field of Search...............188/181; 303/20, 21; 310/168, 310/68; 317/5; 318/326, 328; 322/31; 323/4; 324/160, 161, 162, 166; 340/268; 180/105 E

[56] References Cited

UNITED STATES PATENTS

| | | | |
|---|---|---|---|
| 3,469,662 | 9/1969 | Dewar | 303/21 CG X |
| 3,522,973 | 8/1970 | Klein et al. | 188/181 A X |
| 3,563,611 | 2/1971 | Sharp | 303/21 EB |
| 3,450,444 | 6/1969 | Ballard | 303/21 EB |
| 3,507,544 | 4/1970 | Wakamatsu et al. | 303/21 CG |
| 3,114,872 | 12/1963 | Allard | 323/4 |
| 3,245,213 | 4/1966 | Thompson et al. | 303/21 EB |
| 3,339,095 | 8/1967 | Schlabach et al. | 322/31 X |
| 2,991,407 | 7/1961 | Murphy | 323/4 |
| 3,184,606 | 5/1965 | Ovenden et al. | 317/5 X |

*Primary Examiner*—Duane A. Reger
*Assistant Examiner*—Stephen G. Kunin
*Attorney*—Michael S. Striker

[57] ABSTRACT

A generator wheel turning with the vehicle wheel forms a magnetic circuit with a core and coil, the air gap between the core and generator wheel varying constantly during rotation of the latter so as to produce an alternating voltage in the coil, which is fed a direct current from a constant current source.

19 Claims, 5 Drawing Figures

INVENTOR
Karl BÄCHLE
Jürgen KNORR

By Michael S. Striker
their ATTORNEY

ARRANGEMENT FOR DETECTING SLIDING AND SLIPPAGE OF VEHICLE WHEELS

CROSS-REFERENCES TO RELATED APPLICATIONS

A related application has been filed by inventors GUNSSER et al., under Ser. No. 879,044.

BACKGROUND OF THE INVENTION

The invention relates to an arrangement for detecting the slippage of wheels of vehicles running on a surface, such as a road or on rails.

In one prior-art arrangement, there is associated with each wheel a pulse generator producing pulses of which the intervals are dependent on the circumferential speed of the wheel.

When braking a vehicle, care must be taken that the wheels do not lock and therefore slide on the supporting surface. The coefficient of friction between a sliding wheel and the surface is considerably less than between a rolling wheel and the surface. It is also desirable to avoid locking of the wheels, because the vehicle otherwise may skid. A wheel becomes locked when the force in the longitudinal direction of the vehicle, exerted by the brake shoes on the brake pressure plate or the brake drum, is greater than the vertical component of the maximum static friction, which latter is dependent on the coefficient of friction between the wheel and the surface and proportional to the wheel load.

When braking a vehicle on a level surface, the rear wheels are loaded less and the front wheels are loaded more. To prevent locking of the rear wheels, the braking force acting on them must be reduced below that acting on the front wheels. Braking on curves is made more safe by apportioning the braking action to each wheel, the wheels on the outside of the curve being more strongly braked than those on the inside.

The problems associated with vehicular braking systems are also present in principle with driving arrangements for vehicles. When the driving wheels of a road vehicle slip, the vehicle is liable to skid. With rail vehicles, considerable time can be lost while accelerating if the drive wheels slip on the tracks.

In the prior art, braking regulating systems are known for detecting and controlling sliding. In these systems, the braking is automatically released if the wheel rpm falls excessively. An excessive reduction of the rpm indicates the beginning of slippage. Also known are electrical pulse generators, which comprise an electric pulse generating contact that is operated by the relative movement between a flywheel mass and the wheel drive shaft during excessive acceleration or retardation.

All of these known arrangements have the disadvantage that the generator that indicates excessive acceleration or retardation does not operate wear free. Moreover, they also have the drawback that they operate with a considerable time delay. Therefore, when wheel sliding or slippage begins, there is a certain delay before these systems act upon the braking system or the driving system.

SUMMARY OF THE INVENTION

An object of the invention is an arrangement for detecting, without wear and virtually without delay, the sliding and slippage of wheels, and which provides a strong signal for the evaluator circuit.

The invention consists essentially of a pulse generator means associated with at least one wheel of the vehicle, and preferably with all four, for producing pulses at a rate dependent on the circumferential speed of the wheel, including coil means, a core for the coil means having first and second spaced ends, generator wheel means mounted to turn with the vehicle wheel and positioned so that at least one of the first and second core ends is positioned opposite the circumferential part of the generator wheel means, whereby there is defined a magnetic circuit by the core and the generator wheel means, and the circumferential part having at least one geometric irregularity so that during each complete revolution of the generator wheel means, the magnetic circuit is periodically influenced to produce at least one pulse when the vehicle wheel and the generator wheel means turn, whereby the number of pulses generated in a given time interval is indicative of slipping or sliding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
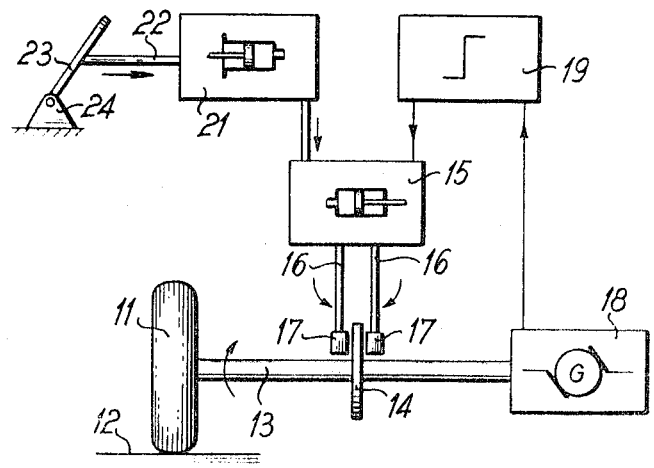
FIG. 1 diagrammatically shows the arrangement of the invention.

FIG. 1 shows the wheel 11 of a vehicle which rolls upon the road surface 12. The wheel 11 is connected to the wheel axle 13 on which is mounted a brake pressure plate 14. Two rods 16, mounting the brake shoes 17, operatively connect a brake cylinder arrangement 17 in a known manner to the brake pressure plate 14. The axle 13 is connected to the mechanical input of a pulse generator 18, and an evaluation circuit 19, which may be of the type discussed in U.S. patent application Serial No. 879,044 of GUNSSER et al, is connected to the electrical output of this pulse generator. The output of the circuit 19 is connected with a first input of the brake cylinder arrangement 15. The second input of the brake cylinder arrangement is connected to an output of a brake cylinder actuator 21. The brake cylinder actuator contains, for example, a pressure cylinder. In this case, the connection between the brake cylinder actuator 21 and the brake cylinder arrangement 15 is preferably a hose for carrying a pressure medium. The brake cylinder actuator 21 is connected, preferably by a further rod 22, to the brake pedal 23. The brake pedal 23 is adjustably arranged on the vehicle chassis 24.

If the driver wants to brake a vehicle containing the arrangement shown in FIG. 1, he presses on the pedal 23. The pressure on the brake pedal is transmitted by the rod 22 and the brake cylinder 21 to the wheels of a vehicle. Through the brake cylinder arrangement 15, the rod 16, and the brake shoes 17, the braking force is exerted on the brake pressure plate 14, thereby slowing down the wheel axle 13 and thus the vehicle wheel 11. If the braking is very sharp, the wheel 11 can lock, so that the wheel no longer rolls, but instead slides, over the road surface 12. This sliding has the disadvantages outlined above. The pulse generator 18 coupled to the axle 13 produces pulses, of which the intervals are dependent on the circumferential speed of the wheel 11. The interval of these pulses is measured by the evaluator circuit 19. If the interval of the pulses produced by the generator 18 exceeds a predetermined value, the evaluator circuit 19 sends a signal to the brake cylinder arrangement 15 that reduces the braking force of the brake shoes 17 on the brake pressure plate 14. The volume of the pulse intervals at which the circuit 19 sends a signal to brake 17 to reduce the braking force is dependent on the circumferential speed of the wheel 11.

Figure 2:
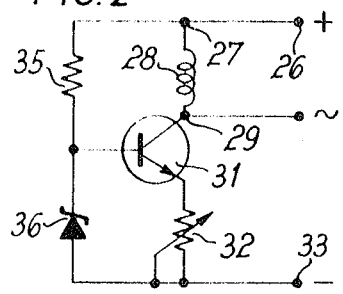
FIG. 2 is a diagram of a circuit for use in the invention.

FIG. 2 shows a circuit diagram of an essential part of the arrangement of the invention. One end 27 of a coil 28 is connected to the positive pole 26 of a DC source, not shown. The other end 29 of the coil 28 is connected to the collector of a transistor 31. The emitter of this transistor is connected through a resistor 32 to the negative pole 33 of the DC source. The resistor 32 is preferably adjustable. A resistor 35 is connected between the positive pole 26 and the base of a transistor 31. Connected between the base of a transistor 31 and a negative pole 33 of the DC source, is a Zener diode 36. The cathode of the Zener diode 36 is connected to the base of the transistor 31.

Figure 3:
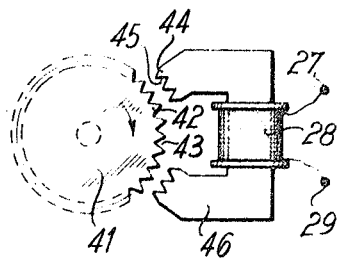
FIGS. 3, 4, and 5 are three different embodiments of the pulse generator wheel and core.
Figure 4:
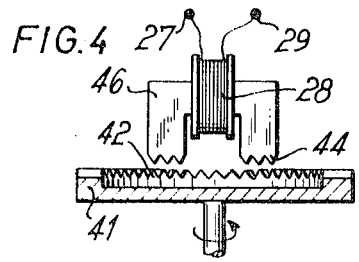
Figure 5:
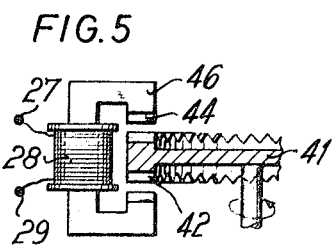

FIGS. 3, 4 and 5 show three different mechanical embodiments of the invention. Corresponding parts in FIGS. 2 to 5 are denoted by the same reference numbers. FIG. 3 shows a generator wheel 41, of which the circumference is toothed in the radial direction, having teeth 42 and tooth gap 43. Opposite the teeth 42 and the tooth gaps 43 are the teeth 44 and tooth gaps 45 of a yoke-shaped coil core 46 that has spaced ends. The coil 28 is mounted on this core. FIG. 4 shows a generator wheel 41 that is toothed in the axial direction. The teeth 42 are axially spaced from the teeth 44 of the core 46. FIG. 5 shows a generator wheel 41, of which the circumference on both sides has teeth 42 extending axially. The yoke-shaped core 46 surrounds a part of the circumference of the wheel 41 like jaws, and the teeth 42 of the wheel 41 are again positioned opposite the teeth 44 of the core 46. The opposed parts of the wheel 41 and the core 46 are in every case so constructed that the spacing between base and base and between tip and tip of two neighboring teeth is constant, and in zero position the tips of teeth 46 are positioned opposite the tips of teeth 41.

In accordance with the invention, the generator wheel 41 has, or both this wheel and the core 46 have, at least one inhomogeneity in their mutually opposed parts. The inhomogeneity can be a tooth, already explained, or any other suitable known means for influencing the magnetic circuit formed by the wheel 41 and the core 46 as the former rotates with respect to the latter.

The operation of the arrangement of the invention will be explained in connection with FIG. 2. Current flows from the positive pole through the resistor 35 and the Zener diode 36 to the negative pole 33. The Zener diode acts accordingly as a constant voltage source. The transistor 31, connected to this constant voltage source and to the resistor 32, acts as a constant current source. A constant current flows through the coil 28, which is connected between the collector of the transistor 31 and the positive pole of the source. This current of constant value magnetizes the core 46 mounting the coil 28. The amount of the magnetizing current can be varied by adjusting resistor 32. A part of a controlled system, which is independent of the arrangement of the invention, can be used in place of the resistor 32.

The core 46 shown in FIGS. 3 to 5 is preferably composed of laminations of dynamo sheer iron, and the generator wheel 41 is made of solid plain steel. As soon as the generator wheel 41 turns, the effective air gap between the core 46 and the wheel 41 changes periodically, since the position of the teeth 42 and the tooth gaps 43, change with respect to the teeth 44 and the tooth gaps 45 of the core 46. Consequently, once the generator wheel 41 begins to turn, the inductance of the core 28 changes continuously. While the transistor 31 continues to furnish current of constant value to the coil 28, the alternating potential that appears between the terminals 27 and 29 of the coil 28, is superimposed on the DC voltage drop across the coil 28. This superimposed alternating voltage can be picked off the terminal 29 of the coil 28. Since the transistor constant current source inherently has a high internal resistance, the generated alternating voltage is not damped.

In accordance with the invention, the core 46 can be a permanent magnet. Furthermore, at least the circumferential part of the generator wheel 41 can be made of a material with high magnetic permeability or other material with high magnetic retentivity. In this latter case, the circumferential part is magnetized with alternating poles in the direction of the core 46. The arrangement of the invention is an inexpensive and reliable solution to the problem of obtaining information as to the circumferential speed of the vehicle wheels. The generator wheel operates without wear. In arrangements having conventional inductive pulse generators with a DC magnetization, a part of the alternating voltage of the pulse generator is short-circuited by the internal resistance of the DC source and the resistor for adjusting the magnetizing current. In the arrangement of the invention, on the other hand, the magnetizing current can be set as high as desired without appreciably damping the generated alternating voltage.

The invention can also be used to regulate the pulling or driving force of wheels, particularly the wheels running on rails. When the wheels slip, or spin, an excessive number of pulses is produced, and when the wheels lock, no pulses are produced.

It will be understood that each of the elements described above, or two or more together, may also find a useful application in other types of constructions differing from the types described above.

While the invention has been illustrated and described as embodied in an arrangement for detecting sliding and slippage of vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for detecting slipping and sliding with respect to the road surface of the wheels of a vehicle, comprising pulse generator means associated with at least one vehicle wheel for producing pulses at a rate dependent on the circumferential speed of the wheel and including a magnetic circuit comprising a core of electromagnetizable material; means for periodically varying the reluctance of said magnetic circuit with a frequency proportional to the circumferential speed of said vehicle wheel; and combined excitation and speed-signal furnishing means comprising a single coil surrounding a part of said core and having two terminals, and a constant current source connected to at least one of said terminals and supplying a substantially constant current to said coil, so that, due to said varying of the reluctance of said magnetic circuit periodically with a frequency proportional to the speed of said vehicle wheel, electrical pulses will appear at said terminal of said coil with a spacing indicative of whether skidding is taking place.

2. A combination as defined in claim 1, in combination with means for regulating the driving force of motor vehicle wheels on tracks.

3. A combination as defined in claim 1, including brake means for the vehicle wheel, and means responsive to pulses generated by said pulse generator means to release said brake means upon absence of a pulse.

4. A combination as defined in claim 1, including means for adjusting the current of said constant current source.

5. A combination as defined in claim 1, said constant current source having transistor means having an output path with first and second terminals and a control electrode, a constant voltage source having first and second terminals of which said first terminal is connected to said control electrode, resistance means having first and second terminals of which said first terminal is connected to said first output path terminal and said second terminal is connected to said second constant voltage source terminal, said coil means being connected to said second output path terminal.

6. A combination as defined in claim 5, wherein said resistance means is adjustable.

7. A combination as defined in claim 5, wherein said resistance means is part of a controlled system.

8. A combination as defined in claim 1, in combination with means for regulating the braking force applied to at least one wheel of a vehicle.

9. An arrangement as defined in claim 1, wherein said core has a pair of spaced ends, said magnetic circuit further comprising generator wheel means of electrically conductive material rotatable with said vehicle wheel and having at least one portion positioned opposite at lease one of said spaced ends, said portions including at least one first geometric irregularity which, during rotation of said generator wheel, will pass into and out of said magnetic circuit, and thereby vary the reluctance of said circuit.

10. A combination as defined in claim 9, wherein a circumferential portion of the generator wheel means has a plurality of said irregularities.

11. A combination as defined in claim 10, wherein at least said circumferential portion comprises material of high magnetic retentivity that is magnetized with alternating poles in the direction of said one core end.

12. A combination as defined in claim 10, wherein at least one of said spaced ends has a plurality of second geometric irregularities corresponding to and cooperating with said at least one first geometric irregularity.

13. A combination as defined in claim 12, wherein at least a circumferential part of said generator wheel means comprises material of high magnetic permeability.

14. A combination as defined in claim 13, wherein the irregularities of said circumferential portion consist of regularly spaced recesses.

15. A combination as defined in claim 12, wherein said second irregularities are regularly spaced recesses.

16. A combination as defined in claim 9, wherein said core is yoke-shaped and each of said ends is positioned opposite a circumferential part of the generator wheel means.

17. A combination as defined in claim 16, wherein said spaced core ends are aligned and located on opposite sides of said generator wheel means.

18. A combination as defined in claim 9, wherein said at least one core end is positioned radially opposite said generator wheel means.

19. A combination as defined in claim 9, wherein said generator wheel means defines an axis of rotation and said at least one core end is positioned opposite said generator wheel means along a line parallel to said axis.

* * * * *